United States Patent
Hawighorst et al.

(10) Patent No.: US 10,543,940 B2
(45) Date of Patent: Jan. 28, 2020

(54) PACKING ARRANGEMENT AND METHOD FOR PACKING A PRODUCT

(71) Applicant: Windmoeller & Hoelscher KG, Lengerich (DE)

(72) Inventors: Thomas Hawighorst, Hasbergen (DE); Martin Hohenbrink, Hagen a.T.W. (DE); Daniel Narberhaus, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 514 days.

(21) Appl. No.: 15/182,914

(22) Filed: Jun. 15, 2016

(65) Prior Publication Data
US 2016/0362201 A1 Dec. 15, 2016

(30) Foreign Application Priority Data
Jun. 15, 2015 (DE) .......................... 10 2015 210 972

(51) Int. Cl.
*B65B 1/04* (2006.01)
*H04L 12/28* (2006.01)
*H04L 29/08* (2006.01)

(52) U.S. Cl.
CPC ................ *B65B 1/04* (2013.01); *H04L 12/28* (2013.01); *H04L 67/1097* (2013.01); *G05B 2219/45048* (2013.01)

(58) Field of Classification Search
CPC .......................................... G05B 2219/45048
See application file for complete search history.

(56) References Cited

U.S. PATENT DOCUMENTS

| | | | | |
|---|---|---|---|---|
| 6,975,913 B2* | 12/2005 | Kreidler et al. | ... | G05B 19/4183 700/96 |
| 7,684,889 B2* | 3/2010 | Focke et al. | .......... | B65B 19/228 131/283 |
| 2002/0161467 A1* | 10/2002 | Hashiguchi et al. | ........................ | G05B 23/0229 700/116 |
| 2006/0155397 A1* | 7/2006 | Focke et al. | ............ | B65B 19/28 700/83 |
| 2006/0173565 A1* | 8/2006 | Fertig et al. | ............ | B65B 57/00 700/95 |
| 2007/0270991 A1* | 11/2007 | Dye | ........................ | B65B 57/02 700/108 |
| 2013/0036198 A1* | 2/2013 | Galm et al. | ........ | G05B 19/4185 709/217 |
| 2014/0173637 A1* | 6/2014 | Becker et al. | ..... | G05B 23/0272 719/318 |
| 2015/0005906 A1* | 1/2015 | Fiori | .................. | G05B 19/0426 700/83 |

FOREIGN PATENT DOCUMENTS

| | | | | |
|---|---|---|---|---|
| DE | 102005037916 | | 5/2006 | |
| DE | 102008033549 | | 2/2009 | |
| DE | 202013011509 U1 | * | 2/2014 | ............. B65B 57/00 |
| DE | 102013216347 A1 | * | 2/2015 | ......... G06F 3/04886 |
| EP | 2555066 | | 2/2013 | |
| WO | WO-2011141394 A1 | * | 11/2011 | ....... G05B 19/41845 |
| WO | WO 2013/018074 | | 2/2013 | |

* cited by examiner

*Primary Examiner* — Stephen F. Gerrity
(74) *Attorney, Agent, or Firm* — Jacobson Holman, PLLC.

(57) ABSTRACT

A packaging unit includes at least two of a bagging unit, a pallet loading device, and a pallet securing device. The bagging unit, the pallet loading device, and the pallet securing device are connected to each other via at least one data transmission device.

9 Claims, 3 Drawing Sheets

PACKING ARRANGEMENT AND METHOD FOR PACKING A PRODUCT

BACKGROUND OF THE INVENTION

1. Field of the Invention

The invention relates to a packing arrangement and a method for packing a product in a plurality of bags or sacks.

2. Description of Related Art

Frequently, larger quantities of a product which is particularly free flowing, pourable, or flowable are packed in such a packing arrangement in quantities that can be transported.

Such a packing arrangement is placed on a larger area so that the operator can oversee the entire equipment with difficulty only. In particular, alarms may be overlooked. Additionally, the operation of the entire arrangement is time-consuming due to the spatial distances and thus difficult.

SUMMARY OF THE INVENTION

The objective of the present invention is therefore to further develop a packing arrangement and a method for packing a product in a plurality of bags or sacks such that it can be controlled more easily.

The objective is attained in the features of the invention described herein. The description illustrates additional embodiments of the packing arrangement according to the invention and the inventive method, with it being possible to use the features mentioned in the context with the packaging arrangement according to the invention also in connection with the inventive method and vice versa, so that here mutually the respective features can be referenced.

According to the invention the packing arrangement may comprise a bagging unit, in which the product, frequently stored in a silo, is bagged into individual bags or sacks. Such arrangements are called form, fill, and seal machines, because from a tubular material individual bags are generated, open at the top, which are also filled with the product in said device, and are sealed at the upper, open end.

According to the invention, the packing arrangement may comprise a device for placing a plurality of bags or sacks filled with the product onto a pallet, with several generally successively supplied bags being combined and arranged in a layer. Several such layers are successively stacked on a pallet until a desired height is reached.

Such a packing arrangement according to the invention may comprise a tie-down device for securing the pallets loaded with bags (pallet securing device), with generally the pallet loaded with bags being wrapped with a plastic coating (stretch hood), or with a film, particularly a stretch film. Such a secured pallet can now be transported, in general.

The invention now includes one of these devices or an arbitrary combination thereof.

According to the present invention a data line is provided by which at least two of the above-mentioned devices can be connected to each other. This way it is possible that data can be transmitted to one of the other devices. This allows the operator present at one of the devices to gather information about the other device and/or to control it without it being necessary for him/her to move to the respective device.

In one advantageous embodiment it is provided that the data transmission device comprises a LAN network. This refers to a wired network (wire, fiberglass, etc.) In generally, any type of radio-based network is possible; however a wired network offers particular advantages due to the usually higher transmission rates. Particularly when the devices are arranged stationary, laying cables is no serious disadvantage.

In one advantageous further embodiment of the invention it is provided that the data transmission device comprises an Ethernet-based network. Accordingly, the Ethernet technology may be used, which combines data transmission protocols with a wired data network.

In one advantageous embodiment of the invention it is provided that at least one of the devices comprises a database, by which one of the other devices can access the database via the data transmission device. This way the operator is enabled in particular to obtain at the device he/she is presently located at all information, for example for events that have occurred, from another device and to process it. Inversely, the operator can modify the database of the other device, for example by changing a production parameter set there. Here, each of the devices may preferably comprise its own database in order to record internal data, thus the data referring to the respective machine. In particular, the operator can be enabled to access the databases of all devices from all other devices, with here preferably allowing the data concerning all devices to be displayed in a single illustration. In this case the operation of the entire packing arrangement is particularly simplified.

It is advantageous if at least one of the devices comprises a bulk memory. In particular, a bulk memory can be provided in each device, offering the above-mentioned advantages. However it is also advantageous if the bulk memory is localized in one of the devices, which reduces the technical expense. In particular, in this case a computer can be provided which receives data from the devices and transmits it to the bulk memory in a uniform data format.

The bulk memory and/or the computing device may be provided in the control panel of the respective device, which particularly keeps the wiring expense low.

In another embodiment of the invention it is provided that via the data transmission device datasets can be exchanged between the devices, with the datasets showing a common data format. With a common data format it is particularly easy to jointly display the data without first being required to perform reformatting and/or conversion steps. It appears therefore to the operator that the data display seemingly originates in a single data source, even if the data come from different devices. This way it can also be possible that the data regarding certain events is generated in one of the devices but saved in one of the other devices. This can relate for example to the transport devices between two devices. Here, for example the transport device between the bagging unit and the pallet loading device can be controlled by the pallet loading device, however the data can also be saved in the bagging device.

Here it is advantageous if the datasets can be saved in a common data format in the bulk memory. This way, identical computer programs can run on computing devices of the individual devices, which minimizes the programming expense.

In another embodiment of the invention a control and information system is provided for at least at one of the devices. With this control and information system the operator is provided with a terminal by which he/she can obtain information about all devices and can control all devices. This simplifies the operation of the complete packing arrangement.

BRIEF DESCRIPTION OF THE DRAWINGS

Additional advantages, features, and details of the invention are discernible from the following description, in which various embodiments are described in detail with reference to the drawings. Here, the features mentioned in the claims and the description are each potentially relevant for the invention individually or in arbitrary combinations of the features mentioned. Within the scope of the entire disclosure, features and details described in the context with the method according to the invention also apply in the context with the inventive packing arrangement and vice versa, so that with regards to the disclosure of the individual aspects of the invention always mutual reference is made or can be made. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
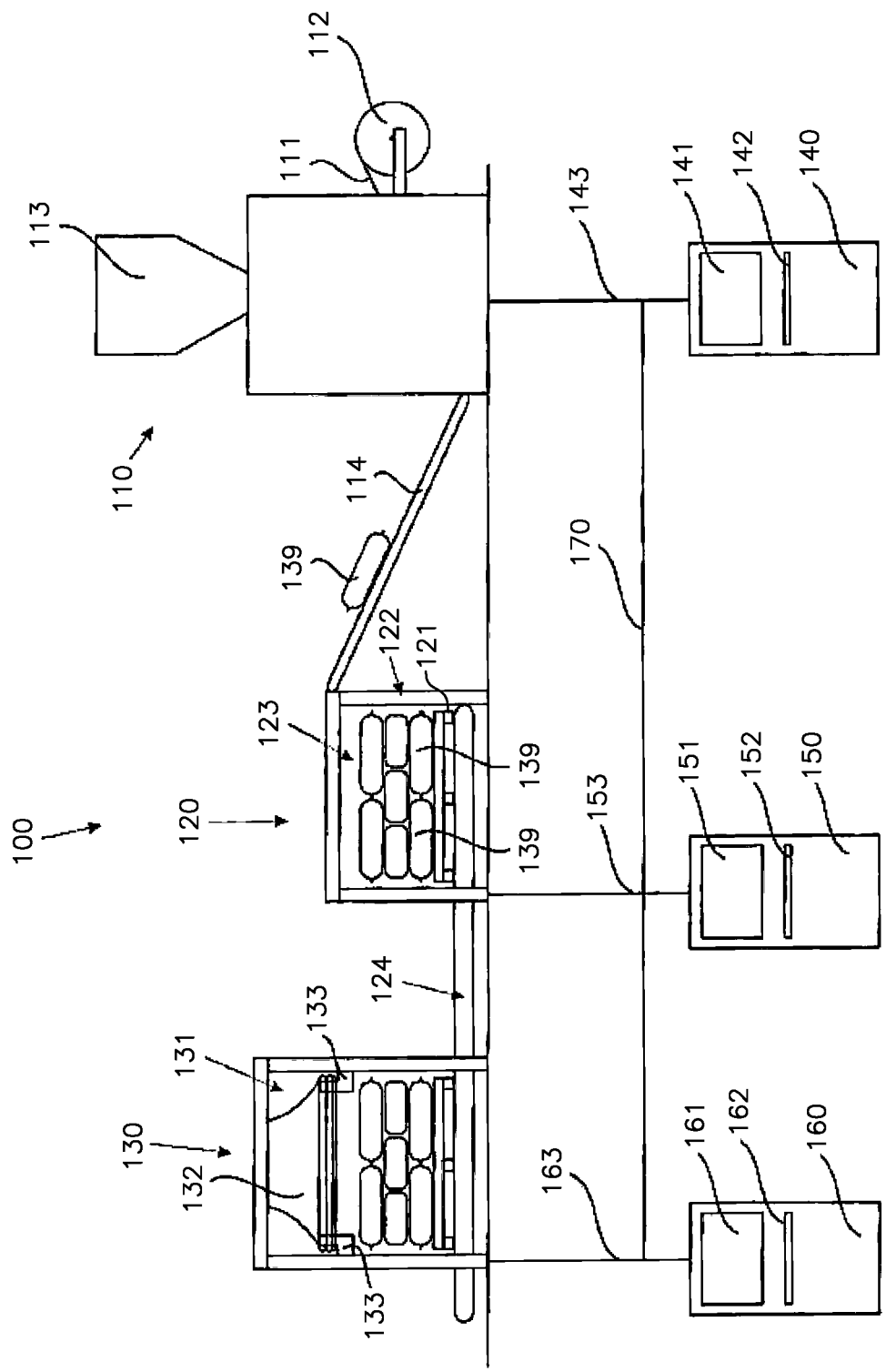
FIG. 1 schematic illustration of a packing arrangement according to the invention, FIG. 2 schematic illustration of another packing arrangement according to the invention, FIG. 3 illustration of the function of a data filter of a packing arrangement according to the invention, FIG. 4 monitor display of a device of the packing arrangement according to the invention.

FIG. 1 shows a schematic illustration of a packing arrangement 100 according to the invention, a bagging unit 110, a pallet loading device 120, and a load securing device 130. The bagging device 110 is supplied with a tubular packing means 111, which is stored on a roll 112. This packing means 11 is pulled off the roll 112.

The front end of this packing means 111 is provided with a bottom seam and cut to a bag length such that a bag develops, which is open towards the top. It is grasped at its upper end by a pair of graspers and transported to a filling station. Here, the upper end is pulled such that the inside of the bag becomes accessible. Now the bag can be filled with the product to be bagged, which is freely flowing, but represents a solid substance (thus is not a liquid) in the desired quantity, for example 25 kg. The product is here stored in a silo 113 and is taken therefrom. Subsequently the still open but already filled bag is moved to a sealing station, in which a head seam is applied, sealing the bag, generally by way of a welding process.

The filled bags 139 are now transported with a transport device 114, which may comprise several conveyer belts, to the pallet loading device 120. Here, several bags 139 are collected above a pallet 121 and arranged there. This arrangement of bags is placed onto the pallet and forms there a bag layer 122. In this bag layer the bags are generally arranged varying in reference to the previous bag layer, in order to this way increase the stability of the stack of bags 123.

The completely loaded pallet 121 is now moved by a conveyer device 124 to the load securing device 130, where the loaded pallet is provided with a cover, a so-called stretch hood 131. For this purpose respectively one gathering finger 133 is arranged at each corner, above the loaded pallet, on which a film hose 132 is stored showing a certain length. Subsequently the gathering fingers 133 move diagonally towards the outside, so that seen in the horizontal direction they are outside the dimensions of the pallet. Here the film hose 132 is stretched. Now the gathering fingers can move downwards and here successively release the film hose so that a smooth hood develops over the loaded pallet. Before or during the downwards motion of the gathering fingers the film hose 132 is severed according to the length required and closed with a welding seam so that the hood 131 is closed at the top. The stretched hood serves not only to securely keep the bags on the pallet during transportation, but it can also serve for protection from environmental influences, such as moisture.

Each of the above-mentioned devices 110, 120, 130 comprise in this exemplary embodiment a control and information device 140, 150, 160, which saves and renders available respective information regarding events in the respective device. For this purpose, the storage device may comprise a computer and at least one bulk memory component, for example in the form of a hard drive, on a magnetic basis and/or a solid-state drive (semiconductor drive). In this storage component now information can be saved regarding various but specified events. Some of these events, for example "production of a filled bag or sack" occur continuously, while other events may occur irregularly. However, storage regarding the respective information occurs for all events.

The storage device 140, 150, 160 may respectively also comprise a monitor 141, 151, 161, on which illustrations can be displayed comprising the various information saved. Furthermore, an input device 142, 152, 162 may be provided, by which for example commands can be entered leading to the above-mentioned illustrations. Data lines 143, 153, 163 lead from the various components of the devices to the storage device 140, 150, 160.

Furthermore, a data line 170 is shown, networking together the devices and also the control and information devices. This way it is possible to access from one of the control and information devices 140, 150, 160 all other control and information devices 140, 150, 160 and/or the devices 110, 120, 130.

Figure 2:
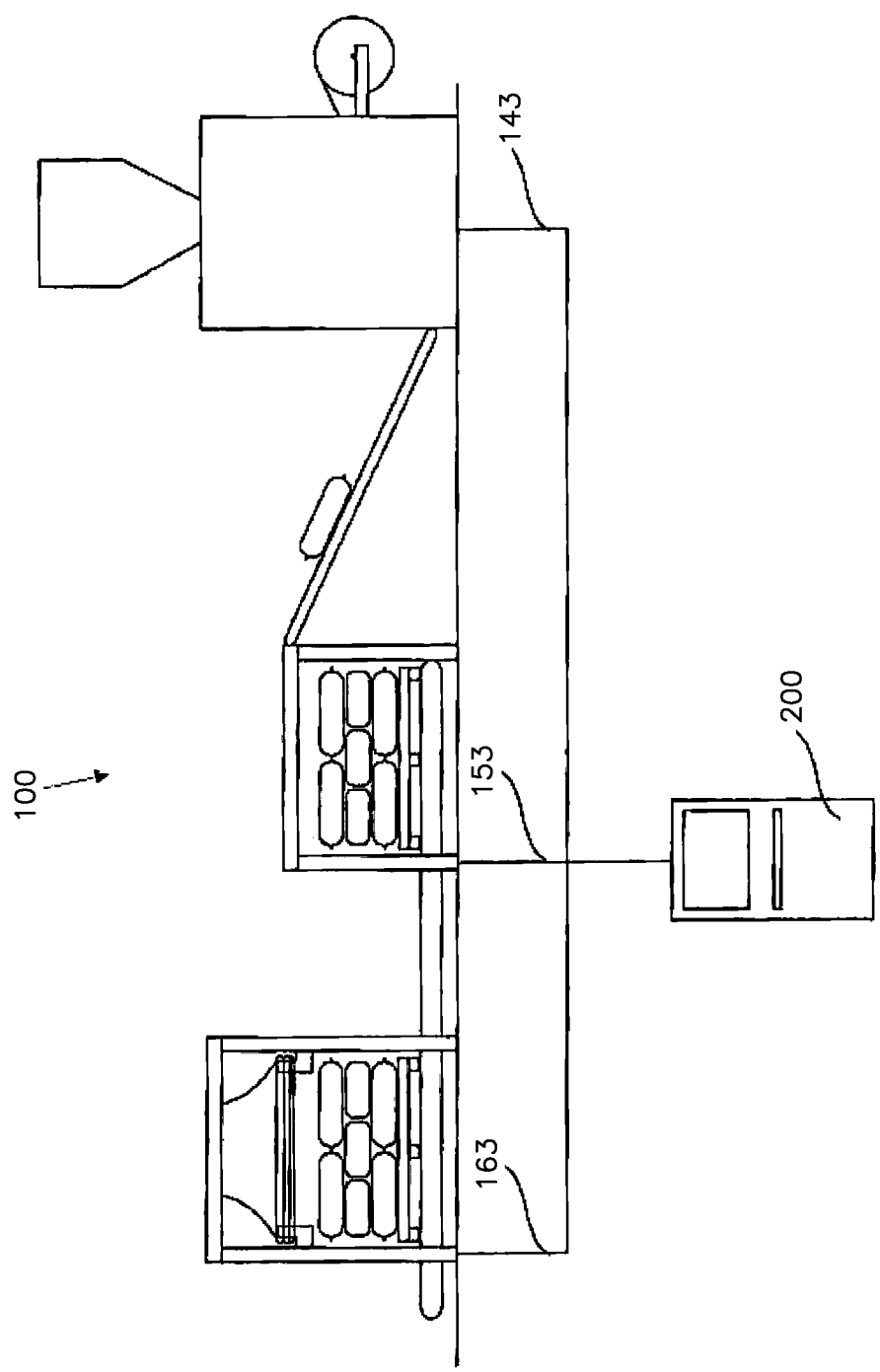

FIG. 2 shows a schematic illustration of another packing arrangement 100 according to the invention, with the devices 110, 120, 130 of the embodiment being equivalent to those of FIG. 1, with here the individual reference characters not being shown for clarity.

Unlike the embodiment in FIG. 1, here the data lines 143, 153, 163 lead to a common storage unit 200, which centrally saves the above-mentioned information for all devices. The actual memory components can alternatively be arranged in the individual devices and here save the information, which increases operational safety, for example if one of the devices malfunctions. The memory device 200 can in this case preferably serve for information processing and displaying purposes. This means that the three devices 110, 120, 130 are networked with each other.

Figure 3:
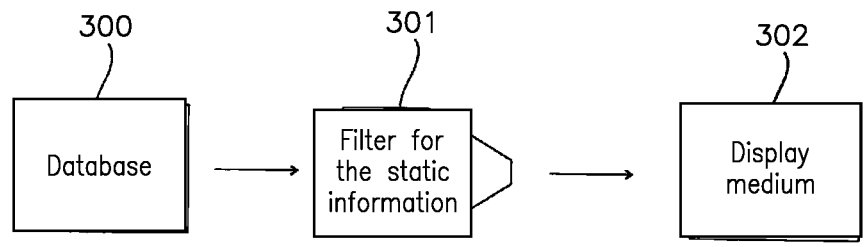

FIG. 3 shows an illustration of the function of a data filter of a packing arrangement according to the invention. Here a database is shown which provides a software connection of events and the corresponding information and organizes the storage in the storage components. Additionally, the database provides information also in case of inquiries.

In a special data inquiry now data can be obtained in the embodiment shown, with only search criteria and/or search ranges being permitted for the static information. For example the user, the recipe, the time, and the machine can be determined for the data inquiry. For example, all information can be searched allocated to events which occurred within the most recent 24 hours. A respective data inquiry in the dynamic information is not provided. The data inquiry is shown in FIG. 3 as filter 301. The data inquiry can then be disclosed to the user by a display medium 302, for example a monitor.

Figure 4:
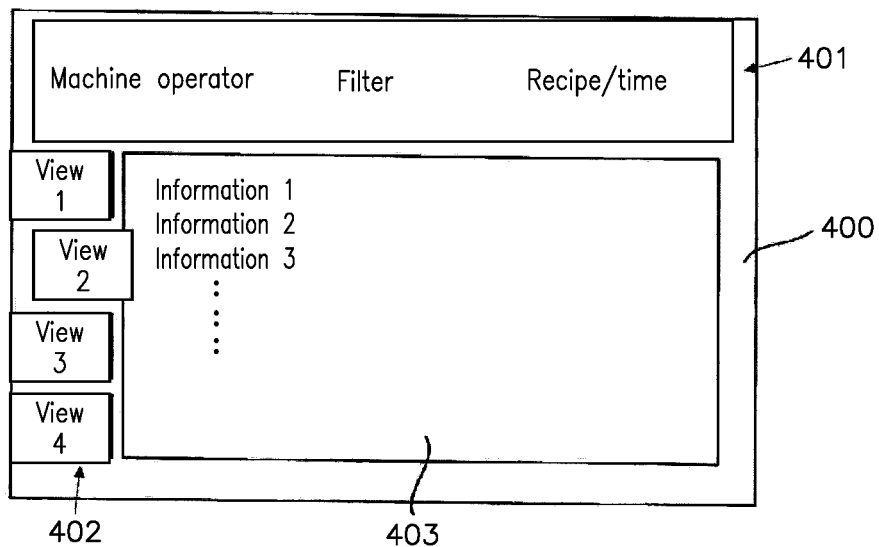

FIG. 4 shows an embodiment for an illustration of the results of a data inquiry on a monitor 400 of one of the control and information systems. In a display range 401 the filter is shown, i.e. the lettering "filter" represents the filter name. Under this filter name the filter can be saved with the respective search criteria.

Now, all events are displayed in the illustration range 402 or all events are shown that match the static information of the search criteria. The event used is shown in FIG. 4 as view 1, view 2, etc. A view can now be selected, in which all static and/or dynamic information regarding the selected event can be displayed. For this purpose, the illustration field 403 is provided.

The exemplary embodiment of FIGS. 3 and 4 serves for the simple formation of a filter as well as the clear illustration of the search results. This can occur, as described above, by one of the control and information devices 140, 150, 160 for all devices. This way, an operator can quickly be informed about important matters of the packing arrangement, such as previous maintenance work performed.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference characters | |
| --- | --- |
| 100 | Packing arrangement |
| 110 | Bagging device |
| 111 | Packing means |
| 112 | Roll |
| 113 | Silo |
| 114 | Transportation device |
| 120 | Pallet loading device |
| 121 | Pallet |
| 122 | Bag layer |
| 123 | Stack of bags |
| 124 | Conveyer device |
| 130 | Load securing device |
| 131 | Stretch hood |
| 132 | Film hose |
| 133 | Gathering finger |
| 139 | Filled bags |
| 140, 150, 160 | Control and information device |
| 141, 151, 161 | Monitor |
| 142, 152, 162 | Input device |
| 143, 153, 163 | Data line |
| 170 | Data line |
| 200 | Storage device |
| 301 | Filter |
| 302 | Display medium |
| 400 | Monitor |
| 401 | Illustration range |
| 402 | Illustration range |

What is claimed is:

1. A packaging unit comprising:
   at least two of
   a bagging device;
   a pallet loading device; and
   a pallet securing device,
   with the devices being connected to each other via a data transmission device, each of the devices including its own database, and at least one of the devices including a data pool, such that with one of the other devices the data pool is accessible via the data transmission device,
   with, via the data transmission device, data sets having a common data format being exchangeable between the devices, and
   with, via a control and information system provided for at least one of the devices, the data sets being displayed from all of the devices on a terminal, such that the other devices are controllable by the control and information system.

2. A packaging unit according to claim 1, wherein the data transmission device includes a local area network.

3. A packaging unit according to claim 1, wherein the data transmission device includes an Ethernet-based network.

4. A packaging unit according to claim 1, wherein at least one of the devices includes a bulk memory.

5. A packaging unit according to claim 4, wherein the bulk memory is located in one of the devices.

6. A packaging unit according to claim 4, wherein the bulk memory is distributed over at least two of the devices.

7. A packaging unit according to claim 4, wherein the data sets are savable in the common data format in the bulk memory.

8. A method of packaging a free-flowing product, said method comprising at least two of the following steps in at least two different devices:
   bagging the product in bags or sacks;
   loading a plurality of the bags or sacks onto pallets; and
   securing the bags or sacks stacked on the pallet,
   with data associated with at least one of the steps being transmitted from the respective device via a data transmission device to another device,
   with each of the devices including its own database, and at least one of the devices including a data pool, such that with one of the other devices the data pool is accessed via the data transmission device,
   with, via the data transmission device, data sets having a common data format being exchanged between the devices, and
   with, via a control and information system provided for at least one of the devices, the data sets being displayed from all of the devices on a terminal, such that the other devices are controllable by the control and information system.

9. The method according to claim 8, wherein the data transmission is effected via a local area network.

* * * * *